(12) United States Patent
Chu et al.

(10) Patent No.: US 8,623,977 B2
(45) Date of Patent: Jan. 7, 2014

(54) NON-HYDROCARBYL HYDROPHOBICALLY MODIFIED POLYCARBOXYLIC POLYMERS

(75) Inventors: Sung G. Chu, Hockessin, DE (US); Dekai Loo, Wilmington, DE (US); Hong Yang, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 408 days.

(21) Appl. No.: 12/621,621

(22) Filed: Nov. 19, 2009

(65) Prior Publication Data

US 2010/0130711 A1 May 27, 2010

Related U.S. Application Data

(60) Provisional application No. 61/199,960, filed on Nov. 21, 2008.

(51) Int. Cl.
*C08F 220/06* (2006.01)
*C08F 220/24* (2006.01)

(52) U.S. Cl.
USPC ......... 526/245; 526/242; 526/250; 526/255; 526/292.7; 526/317.1; 526/318.3; 526/318.4; 526/321; 526/323.2; 526/335; 526/338; 526/279

(58) Field of Classification Search
USPC ......... 526/242, 245, 250, 255, 292.7, 317.1, 526/318.3, 318.4, 321, 323.2, 335, 338
See application file for complete search history.

(56) References Cited

U.S. PATENT DOCUMENTS

| | | | |
|---|---|---|---|
| 2,340,110 A | 1/1944 | D'Alelio | |
| 2,340,111 A | 1/1944 | D'Alelio | |
| 2,533,635 A | 12/1950 | Seymour | |
| 2,708,053 A | 5/1955 | Berger et al. | |
| 2,798,053 A | 7/1957 | Brown | |
| 3,915,921 A | 10/1975 | Schlatzer, Jr. | |
| 3,940,351 A | 2/1976 | Schlatzer, Jr. | |
| 4,062,817 A | 12/1977 | Westerman | |
| 4,267,103 A | 5/1981 | Cohen | |
| 4,693,935 A | 9/1987 | Mazurek | |
| 4,996,274 A | 2/1991 | Hsu | |
| 5,194,541 A * | 3/1993 | Legros et al. | 526/245 |
| 5,288,814 A * | 2/1994 | Long et al. | 525/450 |
| 5,468,797 A | 11/1995 | Adams et al. | |
| 5,641,835 A | 6/1997 | Smith et al. | |
| 6,140,408 A | 10/2000 | McCarthy et al. | |
| 6,794,475 B1 * | 9/2004 | Bialke et al. | 526/320 |
| 2004/0075039 A1 * | 4/2004 | Dubey et al. | 249/134 |
| 2007/0035050 A1 * | 2/2007 | Rogers | 264/1.32 |

FOREIGN PATENT DOCUMENTS

| | | |
|---|---|---|
| EP | 0412704 B1 | 2/1991 |
| EP | 1022587 B1 | 7/2000 |
| EP | 1974913 A3 | 10/2008 |
| WO | WO 90/02144 * | 3/1990 |
| WO | 9712595 | 4/1997 |
| WO | 2003016412 A1 | 2/2003 |

OTHER PUBLICATIONS http://www.chemicalland21.com/industrialchem/organic/ALLY12%20PENTAERYTHRITOL.htm; Mar. 11, 2012.*
http://www.chemicalbook.com/ChemicalProductProperty_EN_CB5437791.htm; Mar. 11, 2012.*

* cited by examiner

*Primary Examiner* — Roberto Rabago
(74) *Attorney, Agent, or Firm* — Shaorong Chen; Joanne Rossi; Michael Herman

(57) ABSTRACT

The present invention involves a cross-linked carboxylic acid hydrophobically modified copolymer product in which cross-linked carboxylic acid is modified with a non-hydrocarbyl hydrophobe, namely, poly(dimethyl siloxane) or fluoronated alkyl methacrylates.

7 Claims, 8 Drawing Sheets

NON-HYDROCARBYL HYDROPHOBICALLY MODIFIED POLYCARBOXYLIC POLYMERS

RELATED APPLICATIONS

This application claims the benefit of U.S. Provisional Application Ser. No. 61/199,960 filed on Nov. 21, 2008, which is incorporated by reference in its entirety.

FIELD OF INVENTION

This invention relates to olefinically unsaturated carboxylic acids or anhydride's which are copolymerized with non-hydrocarbyl hydrophobic monomers to produce polycarboxylic polymers containing an amount of non-hydrocarbyl hydrophobic functionality.

BACKGROUND OF THE INVENTION

Carboxyl containing polymers of vinyl or vinylidene monomers containing at least one terminal $CH_2\!\!=\!\!C\!<$ group are well known. Such polymers may be homopolymers of unsaturated polymerizable carboxylic acids, such as acrylic acid, methacrylic acid, maleic acid, maleic anhydride, itaconic acid and the like; or copolymers of said acid or anhydride monomers with (meth)acrylate esters, (meth)acrylamides, maleic anhydrides, vinyl esters, vinyl ethers, and styrenics; or copolymers with other vinyl or vinylidene monomers. Often, copolymers of these acids are cross-linked with small amounts of cross-linking agents. These materials are normally prepared by polymerization with a free radical catalyst in an organic medium in a closed vessel or autoclave equipped with stirring. During the course of such polymerizations, the polymer begins to precipitate from the solution as it is formed and flocculates and forms aggregates. The precipitated polymer is then recovered and dried to remove residual solvent. The polymer, which is now in a powder form, is used usually by dispersing it in water, neutralizing it, and adding it to a liquid to use its thickening ability. Such polymers are disclosed in U.S. Pat. Nos. 2,798,053; 3,915,921; 3,940,351; 4,062,817; 4,066,583; and 4,267,103.

Copolymers of a crosslinked polymer of polycarboxylic acids, such as polymers of acrylic acid, have become known commercially as "carbomers". Carbomers are efficient rheology modifiers, and also find applications as polymeric emulsifiers and as suspension reagents in such items as lotions, personal care items due to their high thickening efficiency and their high yield stress.

Over the years, these polymers have been modified in various ways in attempts to improve their properties. For example, U.S. Pat. No. 4,996,274, incorporated herein by reference in its entirety, teaches improved properties of thickening and clarity by using specific polymerization media U.S. Pat. Nos. 5,288,814 and 5,468,797, both of which are incorporated herein by reference in their entireties, describe improved carbomers by using steric stabilizing polymeric surface active agents. These patents describe polycarboxylic acid polymers comprising interpolymers of olefinically unsaturated carboxylic acid or anhydride monomers containing at least one activated carbon to carbon olefinic double bond and at least one carboxyl group, and at least one steric stabilizing polymeric surface active agent (also called surfactant), having at least one hydrophilic moiety and at least one hydrophobic moiety and a linear block or random comb configuration, or mixtures thereof.

It is known that unsaturated carboxylic acid polymers can be modified by copolymerizing the carboxylic acid monomers with a comonomer, such as stearyl acrylate to impart hydrophobic properties to the resultant polymer.

There remains a need for improved carbomers having hydrophobes, especially non-hydrocarbyl hydrophobic monomers, directly incorporated into the polycarboxylic polymer backbone rather than incorporating hydrophobic properties indirectly through formation of interpolymers containing hydrophobic properties.

SUMMARY OF THE INVENTION

The present invention is directed to carbomer products in which a non-hydrocarbyl hydrophobic monomer, such as dimethyl siloxane or fluorinated alkyl methacrylate, is incorporated into the backbone of cross-linked carboxylic acid polymer.

In particular the present invention is directed to a cross-linked carboxylic acid copolymer. The cross-linked carboxylic acid copolymer is comprised of recurring units of an olefinic unsaturated carboxylic acid, and recurring units of a non-hydrocarbyl hydrophobic monomers present in an amount of from about 1 to about 10% by weight, more preferably in and amount of from about 3 to 5% by weight of the cross-linked carboxylic acid copolymer. The cross-linked carboxylic acid copolymer of the present invention is crosslinked with a polyfunctional vinyldiene monomer containing at least two terminal $CH_2\!\!=\!\!C\!<$ groups.

DETAILED DESCRIPTION OF THE INVENTION

Figure 1A:
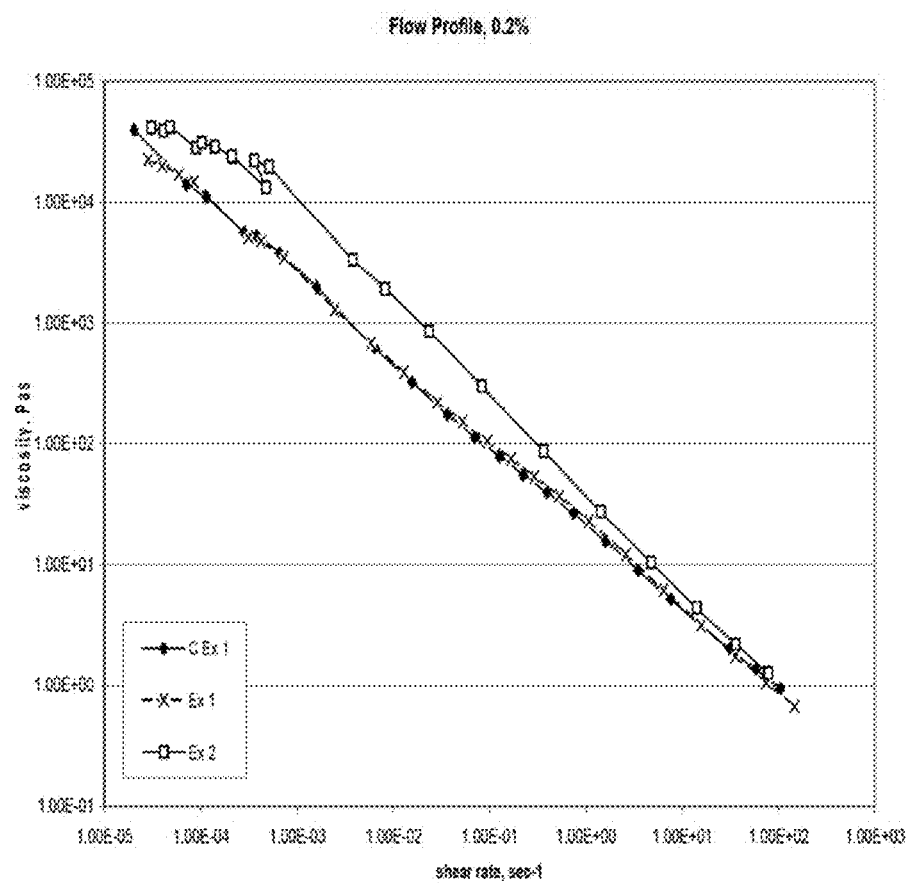
FIGS. 1A and 1B are line graphs depicting the viscosity curves of Examples 1 and 2 as well as Comparative Example 1 where the viscosity of the polymers were measured at various shear rates.

The cross-linked carboxylic acid copolymers of the present invention are prepared from vinylidene monomers containing at least one terminal $CH_2\!\!=\!\!C\!<$ group. Such copolymers may be copolymers of unsaturated, polymerizable carboxylic monomers such as acrylic acid, methacrylic acid, maleic acid, itaconic acid and the like, or copolymers thereof. Typical materials are those described in U.S. Pat. No. 2,708,053, incorporated herein by reference in its entirety. Copolymers, for example, include copolymers of acrylic acid with small amounts of polyalkyenyl polyether cross-linkers that are gel-like polymers, which, especially in the form of their salts, absorb large quantities of water or solvents with subsequent substantial increase in volume. Other useful carboxyl containing polymers are described in U.S. Pat. No. 3,940,351, incorporated herein by reference in its entirety, directed to polymers of unsaturated carboxylic acid and at least one alkyl acrylic or methacrylic ester where the alkyl group contains 10 to 30 carbon atoms. Other types of such copolymers are described in U.S. Pat. No. 4,062,817, incorporated herein by reference in its entirety wherein the polymers described in U.S. Pat. No. 3,940,351 contain additionally another alkyl acrylic or methacrylic ester and the alkyl groups contain 1 to 8 carbon atoms.

The cross-linked carboxylic acid copolymers have molecular weights greater than about 500 to as high as several million, usually greater than about 10,000 to 900,000 or more. Cross-linked carboxylic acid copolymers such as those of acrylic acid, methacrylic acid, maleic acid, or the anhydrides thereof also may be crosslinked with polyfunctional materials as divinyl benzene, unsaturated diesters and the like, as is disclosed in U.S. Pat. Nos. 2,340,110; 2,340,111 and 2,533,635.

The carboxylic monomers useful in the production of copolymers of this invention are the olefinically-unsaturated carboxylic acids containing at least one activated carbon-to-carbon olefinic double bond, and at least carboxyl group; that is, an acid containing an olefinic double bond which readily functions in polymerization because of its presence in the monomer molecule, either in the alpha-beta position with respect to a carboxyl group, —C═C—COOH; or as a part of a terminal methylene grouping $CH_2$═C<. Olefinically-unsaturated acids of this class include such materials as the acrylic acids typified by the acrylic acid itself, acrylic acid, methacrylic acid, ethacrylic acid, alpha-chloro-acrylic acid, alpha-cyano acrylic acid, beta methylacrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acid (1-carboxy-4-phenyl butadiene-1,3), itaconic acid, citraconic acid, mesaconic acid, glutaconic acid, aconitic acid, maleic acid, fumaric acid, and tricarboxy ethylene.

As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure:

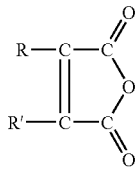

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers for use in this invention are the monoolefinic acrylic acids having the general structure:

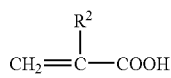

Wherein $R^2$ is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred. Another useful carboxylic monomer is maleic anhydride or the acid.

The copolymers contemplated include both homopolymers of carboxylic acids or anhydrides thereof, or the defined carboxylic acids copolymerized with one or more other vinylidene monomers containing at least one terminal $CH_2$< group. Such materials include, for example, acrylate ester monomers including those acrylic acid ester monomers such as derivatives of an acrylic acid represented by the formula:

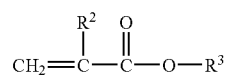

wherein $R^3$ is an alkyl group having from 1 to 30 carbon atoms, preferably 1 to 20 carbon atoms and $R^2$ is hydrogen, methyl or ethyl, present in the copolymer in amount, for example, from about 1 to 40 weight percent or more.

Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like; higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers. One useful class of copolymers are methacrylates where the alkyl group contains 16 to 21 carbon atoms. Typical polymers have been with 10 to 20 weight percent isodecyl methacrylate, 5 to 15 weight percent lauryl methacrylate, 2 to 10 weight percent stearyl methacrylate, with acrylic acid. Mixtures of these two Classes of acrylates provide useful copolymers.

The copolymers also may be cross-linked with any di-, tri-, and tetra-functional crosslinkers such as polyfunctional vinylidene monomer containing at least 2 terminal $CH_2$< groups, including for example, butadiene, isoprene, divinyl benzene, divinyl naphthalene, allyl acrylates, trimethylolpropane diallylether, trimethylpropane triacrylate, allyl sucrose, and tetraallyl pertaarythritol ether and the like. Particularly useful cross-linking monomers for use in preparing the copolymers, if one is employed, are polyalkenyl polyethers having more than one alkenyl ether grouping per molecule. The most useful possess alkenyl groups in which an olefinic double bond is present attached to a terminal methylene grouping, $CH_2$═C<. They are made by the etherification of a polyhydric alcohol containing at least 4 carbon atoms and at least 2 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers includes for example, diallyl esters, dimethallyl ethers, allyl or methallyl acrylates and acrylamides, tetraallyl tin, tetravinyl silane, polyalkenyl methanes, diacrylates, and dimethacrylates, divinyl compounds such as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, ethylene diacrylate, ethylene dimethacrylate, triethylene glycol dimethacrylate, and the like. Allyl pentaerythritol, trimethylolpropane diallylether and allyl sucrose being preferred cross-linking agents.

When the optional cross-linking agent is present, the polymeric mixtures usually contain up to about 5% or more by weight of cross-linking monomer based on the total of carboxylic acid monomer, plus other monomers, if present and more preferably about 0.1 to 2.0 weight percent.

Other vinylidene monomers may also be used, particularly in conjunction with the acrylic acid esters, including the acrylic nitriles, alpha, beta.-olefinically unsaturated nitriles useful are preferably the monoolefinically unsaturated nitriles having from 3 to 10 carbon atoms such as acrylonitrile, methacrylonitrile, ethacrylonitrile, chloroacrylonitrile, and the like. Most preferred are acrylonitrile and methacrylonitrile. The amounts used are, for example, for some polymers are from about 5 to 30 weight percent of the total monomers copolymerized. Acrylic amides include monoolefinically unsaturated amides also may be used. These have at least one hydrogen on the amide nitrogen and the olefinic unsaturation is alpha-beta to the carbonyl group. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts, for example, from about 1 to 30 weight percent of the total monomers copolymerized. Other acrylic amides include N-alkylol amides of alpha, betaolefinically unsaturated carboxylic acids including those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts for example of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meanings. The preferred alkoxymethyl acrylamides are those wherein the alkyl group containing from 2 to 5 carbon atoms, as N-butoxymethyl acrylamide.

Other useful vinylidene comonomers generally include, in addition to those described above, at least one other olefinically unsaturated monomer, more preferably at least one other vinylidene monomer (i.e., a monomer containing at least one terminal $CH_2$=CH< group per molecule) copolymerized, for example, in amounts of up to about 30 percent or more by weight of the total monomers. Suitable comonomers include alpha-olefins containing from 2 to 12 carbon atoms, more preferably from 2 to 8 carbon atoms; dienes containing from 4 to 10 carbon atoms; vinyl esters and allyl esters such as vinyl acetate; vinyl aromatics such as styrene, methyl styrene, chlororstyrene; vinyl and allyl ethers and ketones such as vinyl methyl ether and methyl vinyl ketone; chloroacrylates, cyanoalkyl acrylates such as .alpha.-cyanomethyl acrylate, the alpha-, beta- and gamma-cyanopropyl acrylate; alkoxyacrylates such as methoxy ethyl acrylate; haloacrylates as chloroethyl acrylate; vinyl halides and vinyl chloride, vinylidene chloride and the like; vinyl benzyl chlorides; esters of maleic and fumaric acid and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis(beta-haloalkyl) alkenyl phosphonates such as bis(beta-chloroethyl) vinyl phosphonate and the like as are known to those skilled in the art.

The cross-linked carboxylic acid polymer of the present invention also comprises a non-hydrocarbyl hydrophobic monomer incorporated into the cross-linked carboxylic acid polymer. The non-hydrocarbyl hydrophobic monomer may be a siloxane hydrophobic monomer or a fluorinated hydrophobic monomer.

The siloxane hydrophobic monomer may be a monovinyl-terminated or monovinyl-functional poly(dialkylsiloxane) or poly(diarylsiloxane) or poly(alkylarylsiloxane) where the siloxane hydrophobic monomer has a molecular weight in the range of about Mw 500 to 50,000. If the siloxane hydrophobic monomer is an alkyl, it can range from $CH_3$ to $C_4H_9$. If the siloxane hydrophobic monomer is an aryl, it may be selected from a phenyl or alkylphenyl. A preferred siloxane hydrophobic monomer comprise monomethacrylate(acrylate)-terminated or functional poly(dialkylsiloxane) or poly(diarylsiloxane) or poly(alkylarylsiloxane).

More preferred non-hydrocarbyl hydrophobic monomers of use in the present invention are poly(dimethyl siloxane) and fluorinated alkyl methacrylate.

The non-hydrocarbyl hydrophobic monomers are incorporated into the backbone of cross-linked carboxylic acid polymer. In particular non-hydrocarbyl hydrophobic monomers are copolymerized carboxylic acids or anhydrides thereof in order to produce a copolymer comprised of recurring units of an olefinic unsaturated carboxylic acid, and recurring units of a non-hydrocarbyl hydrophobic monomers present in an amount of from about 1 to about 10% by weight, more preferably in and amount of from about 3 to 5% by weight of the cross-linked carboxylic acid copolymer. The cross-linked carboxylic acid copolymer of the present invention is crosslinked with a polyfunctional vinyldiene monomer containing at least two terminal $CH_2$=C< groups.

In the practice of the invention, the polymerizations use to produce the copolymers of the present invention may be either batch, semi-batch or continuous. The agitation may be any agitation sufficient to maintain the slurry and obtain effective heat transfer including, for example, helical agitators, pitched turbines and the like. A useful reaction temperature range is from the range of 20° C. to 90° C. at about 1 atmosphere or more. Normal polymerization time is from about 5 to 12 hours.

An initiator is typically used in the production of the copolymers of the present invention. The initiator may be selected from the group consisting of di(sec-butyl) peroxidacarbonate, dilauroul peroxide, di(4-tert-butylcyclohexyl) peroxidicarbonate, di(isopropyl)peroxidicarbonate, do(cyclohexyl) peroxidicarbonate, di(cetyl)peroxidicarbonate, and di(n-propyl)peroxidicarbonate. A preferred initiator being ethylhexyl peroxydicarbonate.

The synthesized hydrophobe-modified poly(acrylic acid) are listed in Table 1. The hydrophobe was fixed on 3 wt % level. The crosslinker, TAPE, used in the reactions were ranged from 0.6 wt % to 1.2 wt %.

TABLE 1

Synthesis of Hydrophobe-modified Poly(Acrylic Acid)

| Hydrophobe (wt %) Stearyl methacrylate | Crosslinker and Amount | | Initiator and Amount | |
|---|---|---|---|---|
| | Crosslinker | Ratio/monomer (wt %) | Initiator[2] | Ratio/Monomer |
| 3.0 | TAPE[1] | 0.60 | Trignox | 0.54% |
| 3.0 | TAPE | 0.90 | Trignox | 0.54% |
| 3.0 | TAPE | 1.05 | Trignox | 0.54% |
| 3.0 | TAPE | 1.20 | Trignox | 0.54% |

[1]TAPE, Tetraallyl Pentaerythritol Ether
[2]Trignox EHP C-75, Ethylhexyl Peroxydicarbonate The following methods were used to obtain the various measurements of examples of the invention as well as the comparative examples provided hereinbelow.

Rheological Measurements

Both Rheometric Scientific RFS III (RFS) and Bohlin Instruments CVO 120HR (Bohlin) were used to conduct rheological measurements. The RFS, a strain-controlled rheometer, was used to measure the linear viscoelasticity property of samples. Parallel plates of 40 mm in diameter were used with the gap of 1 mm. The Bohlin, a stress-controlled rheometer, was used to measure the flow curve and yield stress. For flow curve, parallel plates with a geometry of 40 mm in diameter were used with the gap of 1 mm. For yield stress, serrated parallel plates geometry of 25 mm in diameter were used with the gap of 1 mm. All measurements were performed at 25° C. with temperature controllers.

Dynamic Modulus Measurements

Samples were first loaded into the gap between two parallel plates. Overloaded samples were then trimmed off. Strain sweeps were performed at 1 rad/sec of frequency with ramping strain from 0.1% up to 20% for linearity determination purpose. At the maximum linear strain, frequency sweeps were performed from 0.1 rad/sec up to 100 rad/sec. Both storage and loss modulus were recorded for analysis.

Flow Curve Measurements

Samples were first loaded into the gap between two parallel plates. Overloaded samples were then trimmed off. Table of shears with controlled rate stress sweeps were performed from 0.01 Pa up to 200 Pa. Both viscosity and shear rate were recorded for analysis.

Yield Stress Measurements

Samples were first loaded into the gap between two serrated parallel plates. Overloaded samples were then trimmed off. Stress ramp with controlled stress sweeps were performed from 0.01 Pa up to 500 Pa. Both stress and strain were recorded for analysis.

Wetting Time Study

Add 0.25 grams dry polymer, at one time, onto the surface of 50 grams water in 80 ml beaker. Start to count time as the polymer is dumped. Record the time when the dry polymer is no longer visible either on the surface of the water or in the water.

Model Surfactant Formulation

The model surfactant formulation used to test the foam stability of various compositions containing the polymers of the present invention.

TABLE 2

| Ingredients | Function | Wt % |
|---|---|---|
| Water | Solvent | q.s. to 100.00 |
| Poly(acrylic acid) | Rheology Modifier | — |
| Texapon (28%), SLES, available from Cognis | Anionic Surfactant | 40.00 |
| NaOH (18%) | Neutralizer | 2.3 × amount of Poly(acrylic acid) |
| Tegobetaine L7 (30%), CAPB, available from Degussa | Amphoteric Surfactant | 6.70 |
| EDTA | Chelating Agent | 0.05 |
| Phenonip ® preservative, available from Clariant | Preservative | 0.50 |

The polymer was dispersed in water, neutralized with NaOH (18%). Then to the solution was added an anionic surfactant with agitation until a uniform solution was obtained. To this solution a nonionic surfactant was added with agitation until an uniform solution was obtained. During agitation of the solution, EDTA and Phenonip® preservative were added in order and model surfactant formulation was finally adjusted to a pH range of 5.5-6.5. The following examples will serve to illustrate the invention, parts and percentages being by weight unless otherwise indicated.

EXAMPLES

Acrylic acid, potassium carbonate, cyclohexane, and ethyl acetate were obtained from Aldirich. Tetraallyl pentaerythritol ether (TAPE) was obtained from Monomer-Polymer Dajac Labs. Di-2-ethylhexyl peroxydicarbonate (Trignox EHP C-75) was obtained from Akzo Nobel as a 75% solution in mineral oil. α-Butyldimethylsiloxy-ω-(3-methacryloxypropyl)-polydimethylsiloxane was obtained from Chisso Corporation. Perfluoroalkyl methacrylate (ZONYL® TN-A surfactant) was obtained from E.I. duPont de Nemours and Company). HYPERMER™ B246 SF surfactant was obtained from Uniqema. All chemicals were used without further purification.

Examples 1-4 and Comparative Example 1

Preparation of Hydrophobe-Modified Poly(Acrylic Acid)

Comparative Example 1

Ethyl acetate (91.0 g), cyclohexane (78.0 g), potassium carbonate (0.96 g), tetraallyl pentaerythritol ether (0.24 g), HYPERMER™ B246 SF surfactant (0.23 g), stearyl methacrylate (0.69 g), and acrylic acid (23.0 g) were placed in a 3-neck, 500 ml, round-bottom flask, equipped with mechanical stir, condenser, and nitrogen inlet/outlet. The mixture was agitated with a nitrogen purge for 20 minutes. The temperature was raised to 50° C. with continuous nitrogen purge and then switched to nitrogen overflow. Di-2-ethylhexyl peroxydicarbonate (0.165 g in 36 me of ethyl acetate/cyclohexane at above ratio) was added in 6 hours via a syringe pump. After initiator addition, the temperature was kept at 50° C. for 30 minutes and cooled down to room temperature. The solvents were evaporated with a Rotavapor at 105-110° C. for 6 hours.

Preparation of Si-Modified Poly(Acrylic Acid)

Example 1

Ethyl acetate (182.0 g), cyclohexane (156.0 g), tetraallyl pentaerythritol ether (0.51 g), HYPERMER™ B246 SF surfactant, α-Butyldimethylsiloxy-ω-(3-methacryloxypropyl)-polydimethylsiloxane (Silaplane™. FM-0711 siloxane, available from Chisso Corporation) (1.44 g) and acrylic acid (46.0 g) were placed in a 1-liter resin kettle, equipped with mechanical stir, condenser, and nitrogen inlet/outlet. The mixture was agitated with a nitrogen purge for 20 minutes. The temperature was raised to 50° C. with continuous nitrogen purge and then switched to nitrogen overflow. Di-2-ethylhexyl peroxydicarbonate (0.33 g in 27 me of ethyl acetate/cyclohexane at above ratio) was added in 6 hours via a syringe pump. After initiator addition, the temperature was kept at 50° C. for 30 minutes and cooled down to room temperature. The solvents were evaporated with a Rotavapor at 105-110° C. for 6 hours.

Preparation of F-Modified Poly(Acrylic acid)

Example 2

Ethyl acetate (182.0 g), cyclohexane (156.0 g), tetraallyl pentaerythritol ether (0.56 g), HYPERMER™ B246 SF surfactant (0.46 g), Perfluoroalkyl methacrylate (ZONYL® TN-A a fluorocarbon-based surfactant) (1.50 g), and acrylic acid (46.0 g) were placed in a 1-liter resin kettle, equipped with mechanical stir, condenser, and nitrogen inlet/outlet. The mixture was agitated with a nitrogen purge for 20 minutes. The temperature was raised to 50° C. with continuous nitrogen purge and then switched to nitrogen overflow. Di-2-ethylhexyl peroxydicarbonate (0.33 g in 27 me of ethyl acetate/cyclohexane at above ratio) was added in 6 hours via a syringe pump. After initiator addition, the temperature was kept at 50° C. for 30 minutes and cooled down to room temperature. The solvents were evaporated with a Rotavapor at 105-110° C. for 6 hours.

The synthetic conditions are listed in Table 3. The crosslinker and hydrophobe amounts were not optimized.

TABLE 3

Synthesis of Silicon- and Fluoro-Modified Poly(acrylic acid)

| Designation | Solvent | Crosslinker | Hydrophobe | Surfactant |
|---|---|---|---|---|
| Example 1 | Ethyl Acetate/ Cyclohexane (1/1 v/v) | TAPE 1.05 wt % | Silaplane ™. FM 0711 siloxane, 3.0% wt % | Hypermer ™ B246 SF |
| Example 2 | Ethyl Acetate/ Cyclohexane (1/1 v/v) | TAPE 1.05 wt % | ZONYL ® TN-A surfactant, 3.0 wt % | Hypermer ™ B246 SF |

Poly(acrylic acid) with 3 wt % of poly(dimethyl siloxane) (Silaplane™. FM-0711 siloxane, available from Chisso Corporation, having a Mw 1,000) of Example 1 and 3 wt. % of perfluoroalkyl (ZONYL® TN-A, a fluorocarbon-based surfactant, available from E.I. duPont de Nemours and Company having a Mw 569) of Example 2 were synthesized, respectively. $G_N$ of these materials were very similar to that of commercially available hydrophobically modified carbomer product (Carbopol® ETD 2020 hydrophobe-modified carbomer, available from The Lubrizol Corporation), as listed in Table 4.

TABLE 4

$G_N$ of Comparative Example 1 (Carbopol ® ETD 2020 carbomer) and Examples 1 and 2

| Designation | Description | $G_N$ 0.2 Wt. % | $G_N$ 0.5 Wt. % |
|---|---|---|---|
| Comparative Ex 1 | hydrophobe modified carbomer (Carbopol ® ETD 2020 carbomer) | 76 Pa | 175 Pa |
| Example 1 | Poly(dimethyl siloxane)-Modified Poly(Acrylic Acid) | 110 Pa | 149 Pa |
| Example 2 | Perfluoroalkyl-Modified Poly(Acrylic Acid) | 126 Pa | 169 Pa |

Figure 1B:
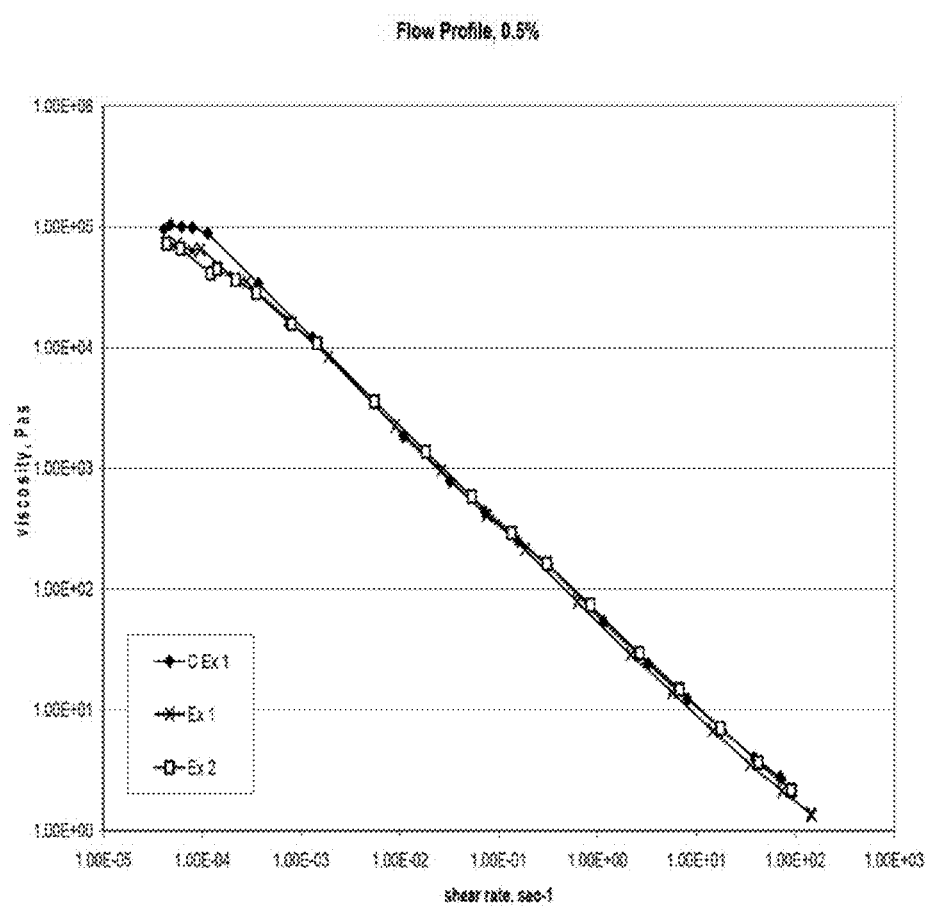

The viscosities of the silicon- and fluoro-modified poly(acrylic acid) of Examples 1 and 2 respectively were studied at 0.2 wt % and 0.5 wt % levels. The results are shown in FIGS. 1A and 1B. The fluoro-modified poly(acrylic acid) of Example 2 showed slightly higher viscosity at 0.2 wt % compared to both hydrophobe modified carbomer of Comparative Example 1 and silicon-modified poly(acrylic acid) of Example 1. The silicon- and fluoro-modified poly(acrylic acid) showed almost identical viscosity behavior with that of Comparative Ex 1.

Figure 2A:
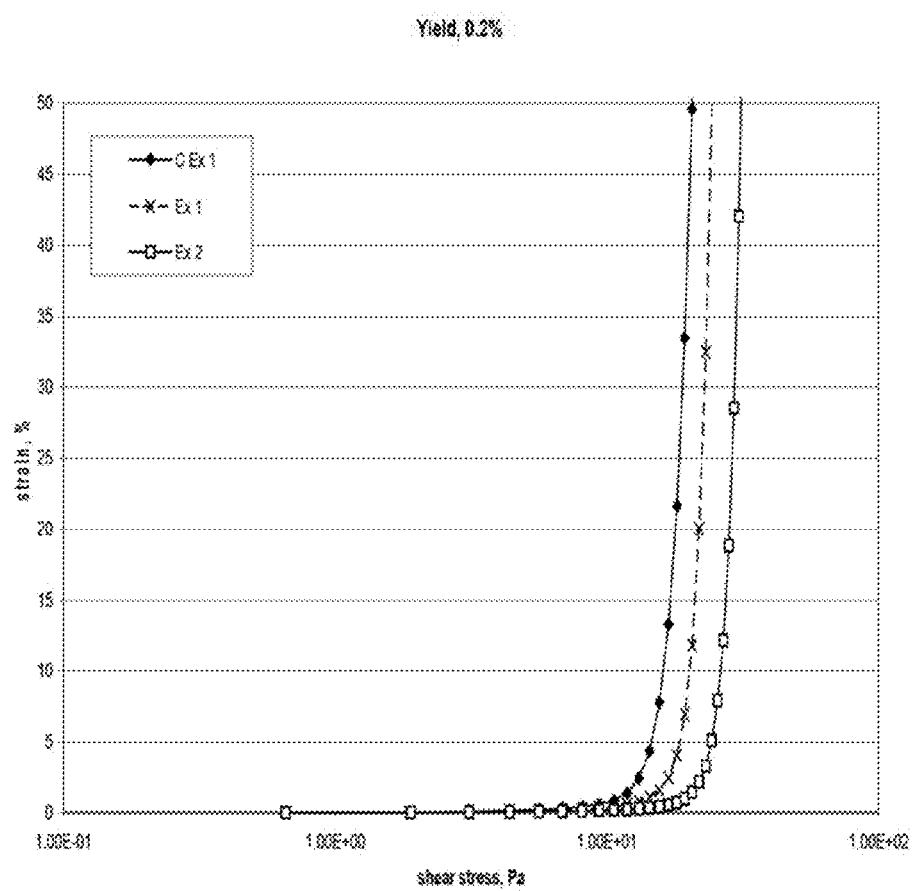
FIGS. 2A and 2B are line graphs depicting the yield stress of the strain versus shear stress from the yield stress measurement of Examples 1 and 2 as well as Comparative Example 1.
Figure 2B:
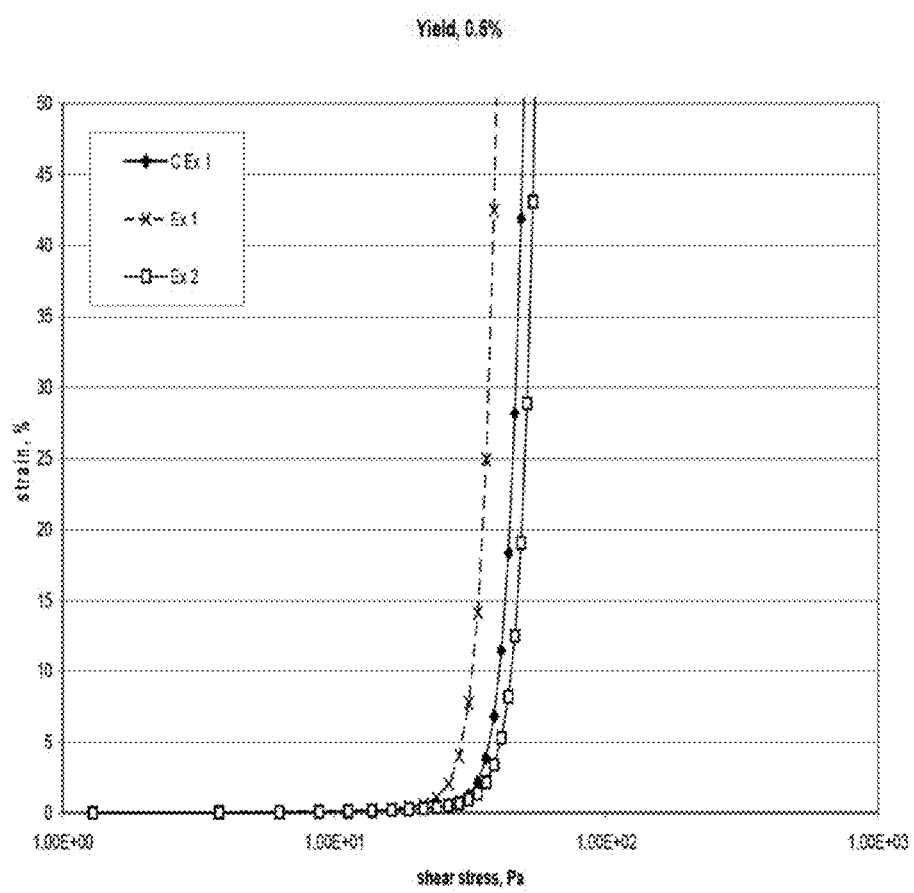

In FIGS. 2A and 2B, the yield stress of the silicon- and fluoro-modified poly(acrylic acid) of Examples 1 and 2 as well as Comparative Ex 1 were studied.

Preparation of Si-Modified Poly(Acrylic Acid)

Example 3

Ethyl acetate (273.0 g), cyclohexane (234.0 g), trimethlolpropane diallylether (1.80 g), HYPERMER™ B246 SF surfactant (0.69 g), a -Butyldimethylsiloxy-w-(3-methacryloxypropyl)-polydimethylsiloxane (Silaplane™. FM-0711 siloxane, available from Chisso Corporation) (2.16 g) and acrylic acid (69.0 g) were placed in a 1-liter resin kettle, equipped with mechanical stir, condenser, and nitrogen inlet/outlet. The mixture was agitated with a nitrogen purge for 60 minutes. The temperature was raised to 50° C. with continuous nitrogen purge and then switched to nitrogen overflow. An initiator comprising di(4-tert-butylcyclohexyl)peroxydicarbonate (0.45 g in 20 me of ethyl acetate/cyclohexane at above ratio) was added in 6 hours via a syringe pump. After the first initiator addition, the second initiator (0.045 g in 2 ml of ethyl acetate/cyclohexane at above ratio) was added once and the temperature was kept at 50° C. for 60 minutes and cooled down to room temperature. The solvents were evaporated with a Rotavapor at 70-80° C. for 3 hours and at 115-120° C. for 6 hours under vacuum of ~10 torrs.

TABLE 5

| Ex 3 Si-modified Poly(acrylic acid) | Concentration 0.2 wt % | Concentration 0.5 wt % | Concentration 1 wt % |
|---|---|---|---|
| Yield Stress $G_N$ | 27.0 Pa | 349 Pa | 745 Pa |
| BF Viscosity (with Helipath spindle). | 2,840 cps | 56,700 cps | 129,700 cps |

Preparation of Si-Modified Poly(Acrylic acid)
Example 4

Ethyl acetate (273.0 g), cyclohexane (234.0 g), trimethlolpropane trimethacrylate (1.04 g), HYPERMER™ B246 SF surfactant (0.69 g), a -Butyldimethylsiloxy-ω-(3-methacryloxypropyl)-polydimethylsiloxane (Silaplane™. FM-0711 siloxane, available from Chisso Corporation) (2.16 g) and acrylic acid (69.0 g) were placed in a 1-liter resin kettle, equipped with mechanical stir, condenser, and nitrogen inlet/outlet. The mixture was agitated with a nitrogen purge for 60 minutes. The temperature was raised to 50° C. with continuous nitrogen purge and then switched to nitrogen overflow. An initiator comprising di(4-tert-butylcyclohexyl)peroxydicarbonate (0.45 g in 20 me of ethyl acetate/cyclohexane at above ratio) was added in 6 hours via a syringe pump. After the first initiator addition, the second initiator (0.045 g in 2 ml of ethyl acetate/cyclohexane at above ratio) was added once and the temperature was kept at 50° C. for 60 minutes and cooled down to room temperature. The solvents were evaporated with a Rotavapor at 70-80° C. for 3 hours and at 115-120° C. for 6 hours under vacuum of ~10 torrs.

TABLE 6

| Ex 4 Si-modified Poly(acrylic acid) | Concentration 0.2 wt % | Concentration 0.5 wt % | Concentration 1 wt % |
| --- | --- | --- | --- |
| Yield Stress $G_N$ | 0 Pa | 6.3 Pa | 39.2 Pa |
| BF Viscosity (with Helipath spindle). | 1,225 cps | 3,390 cps | 10,060 cps |

Application evaluation in aspects of wetting, thickening efficiency in aqueous solution, electrolyte tolerance, thickening efficiency in a model surfactant formulation were carried out for Examples 1 and 2 as well as for Comparative Example 1.

Wetting Study

The wetting time for Comparative Ex 1, Si-, or F-modified poly(acrylic acid) was 1 hour, 5 minutes, and more than 2 hours, respectively.

Thickening Efficiency and Clarity of Aqueous Gel

Figure 3:
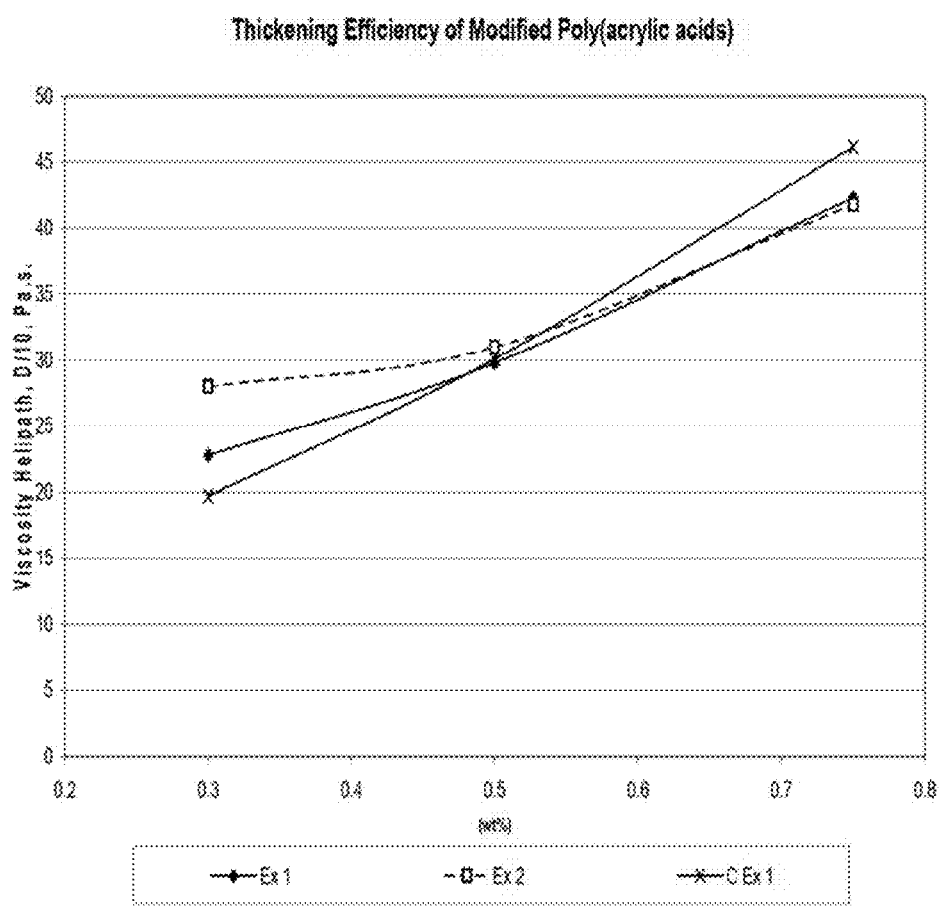
FIG. 3 is a line graph depicting the thickening viscosity of aqueous solutions at different concentrations of Examples 1 and 2 as well as Comparative Example 1.

Thickening efficiency and clarity of aqueous gel at concentration between 0.3 to 0.7 wt % were studied, as shown in FIG. 3 and Table 7.

Comparing to Comparative Example 1, the thickening efficiency of Examples 1 and 2 (Si- or F-modified poly(acrylic acid)) were slightly higher at 0.3 wt %, identical at 0.5 wt %, and slightly lower at 0.7 wt %.

TABLE 7

Clarity and Texture of Aqueous Gel Comparison

| Material | Wt % | Helipath Viscosity D/10 (mPa·s) | Clarity % T. @ 600 nm | Clarity Visual | Texture |
| --- | --- | --- | --- | --- | --- |
| Ex 1 (Si-Modified) | 0.3 | 23.0 | 94.7 | Slightly hazy | Soft Smooth gel |
|  | 0.5 | 29.8 | 93.5 | Slightly hazy | Soft Smooth gel |
|  | 0.7 | 42.4 | 89.5 | Hazy | Soft Smooth gel |
| Ex 2 (F-Modified) | 0.3 | 28.0 | 97.3 | Clear | Soft Smooth gel |
|  | 0.5 | 31.0 | 94.1 | Clear | Soft Smooth gel |
|  | 0.7 | 42.0 | 95.0 | Very Slightly hazy | Soft Smooth gel |
| C Ex 1 | 0.3 | 19.8 | 98.2 | Clear | Soft Smooth gel |
|  | 0.5 | 30.2 | 98.4 | Clear | Soft Smooth gel |
|  | 0.7 | 46.2 | 96.9 | Clear | Soft Smooth gel |

The salt tolerance of synthesized hydrophobe-modified poly(acrylic acid), including linear hydrocarbon, poly(dimethyl siloxane) and perfluoroalkyl, were studied against ETD 2020. The results are listed in Table 8.

TABLE 8

Viscosity (cps) of Examples 1 & 2, Comparative Example 1 and Comparative Examples 2 & 3

| Designation | Description | 0.5 Wt. % 0% NaCl (cps) | 0.5 Wt. % 1.0% NaCl (cps) | 1.0 Wt. % 0% NaCl (cps) | 1.0 Wt. % 1.0% NaCl (cps) |
| --- | --- | --- | --- | --- | --- |
| C Ex 1 | Hydrophobe-Modified Carbopol | 27,000 | 133 | 960,000 | 220,000 |
| C Ex 2 | $C_{22}$-Modified Poly(Acrylic Acid) | 27,260 | 140 | 969,300 | 272,000 |
| C Ex 3 | $C_{22}$-Modified Poly(Acrylic Acid) | 126,200 | 133 | 1,320,000 | 237,300 |
| Ex 1 | Si-Modified Poly(Acrylic Acid) | 464,000 | 9,300 | 834,600 | 229,300 |
| Ex 2 | F-Modified Poly(Acrylic Acid) | 529,300 | 10,660 | 868,000 | 334,600 |

The Viscosity measurement: for the above listed materials was performed using a Brookfield RV Viscometer with a Spindle 5, @ 0.3 RPM and 25° C.

It was observed that the salt tolerance of Comparative Examples 2 & 3 ($C_{22}$-modified poly(acrylic acid)) were very similar to the hydrophobe-modified carbopol of Comparative Example 1. The salt tolerance of Examples 1 & 2 (the silicon- or fluoro-modified poly(acrylic acid)) were very similar. However, their salt tolerance was better than that of both Comparative Examples 2 & 3 as well as Comparative Example 1.

Figure 4:
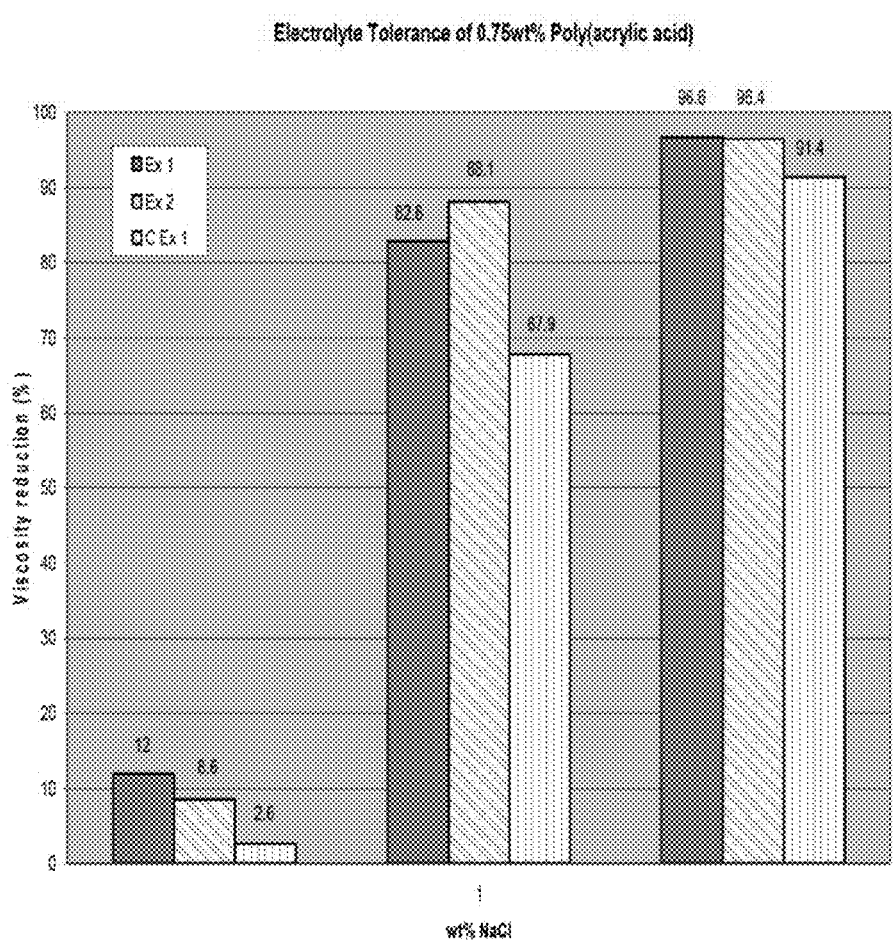
FIG. 4 consists of bar graphs depicting an electrolyte tolerance study of Examples 1 and 2 as well as Comparative Example 1.

The salt tolerance study was repeated and provided different results, as shown in Table 9 and FIG. 4. The salt tolerance of Examples 1 and 2 was not as good as that of Comparative Example 1. In the present of salt, the clarity of Examples 1 and 2 was also not as good as that of Comparative Example 1.

TABLE 9

Salt Tolerance of Examples 1 & 2 versus Comparative Example 1

| Material | Wt % | Viscosity spl C/10 rpm (Pa · s) | | | |
|---|---|---|---|---|---|
| | | 0.00 wt % | 0.20 wt % | 0.50 wt % | 1.00 wt % |
| Example 1 (Si-modified Poly(acrylic acid)) | 0.75 | 37.8 | 14.3 | 6.50 | 1.3 |
| | 1.00 | 55.0 | 36.6 | 18.6 | 6.6 |
| Example 2 (F-modified Poly(acrylic acid)) | 0.75 | 39.4 | 13.6 | 4.7 | 1.4 |
| | 1.00 | 45.8 | 28.3 | 19.4 | 7.6 |
| Comparative Ex 1 | 0.75 | 37.4 | 24.0 | 12.0 | 3.2 |
| | 1.00 | 50.4 | 41.4 | 30.6 | 18.3 |

Application evaluation revealed that the salt tolerance of the Examples 1 & 2 were slightly worse than that of Comparative Example 1. However, Examples 1 & 2 exhibited better suspension power at lower viscosities. Extremely fast wetting property of Example 1 was observed.

TABLE 10

Thickening Efficiency of Examples 1 & 2 versus Comparative Example 1

| Material | Wt % | Viscosity LVT 30 rpm (mPa · s) | Clarity % T @600 nm | Visual | Suspension Power @ Room temperature |
|---|---|---|---|---|---|
| Example 1 (Si-modified Poly(acrylic acid)) | 0.75 | 145 | 7.20 | Opaque | No |
| | 1.25 | 1,520 | 2.80 | Opaque | Yes (>6 weeks) |
| | 1.50 | 1,800 | <1 | Opaque | Not done |
| | 1.70 | 3,900 | <1 | Opaque | Not done |
| | 2.00 | 10,000 | <1 | Opaque | Not done |
| Example 2 (F-modified Poly(acrylic acid)) | 0.75 | 130 | 6.50 | Opaque | No |
| | 1.25 | 1,040 | 3.20 | Opaque | Yes (>6 weeks) |
| | 1.75 | 4,800 | <1 | Opaque | Not done |
| | 2.00 | 8,000 | <1 | Opaque | Not done |
| Comparative Ex 1 | 0.60 | 320 | 7.60 | Opaque | No |
| | 0.80 | 1,200 | 5.10 | Opaque | No (<1 week) |
| | 1.00 | 4,400 | 4.80 | Opaque | Yes (>6 weeks) |

Figure 5:
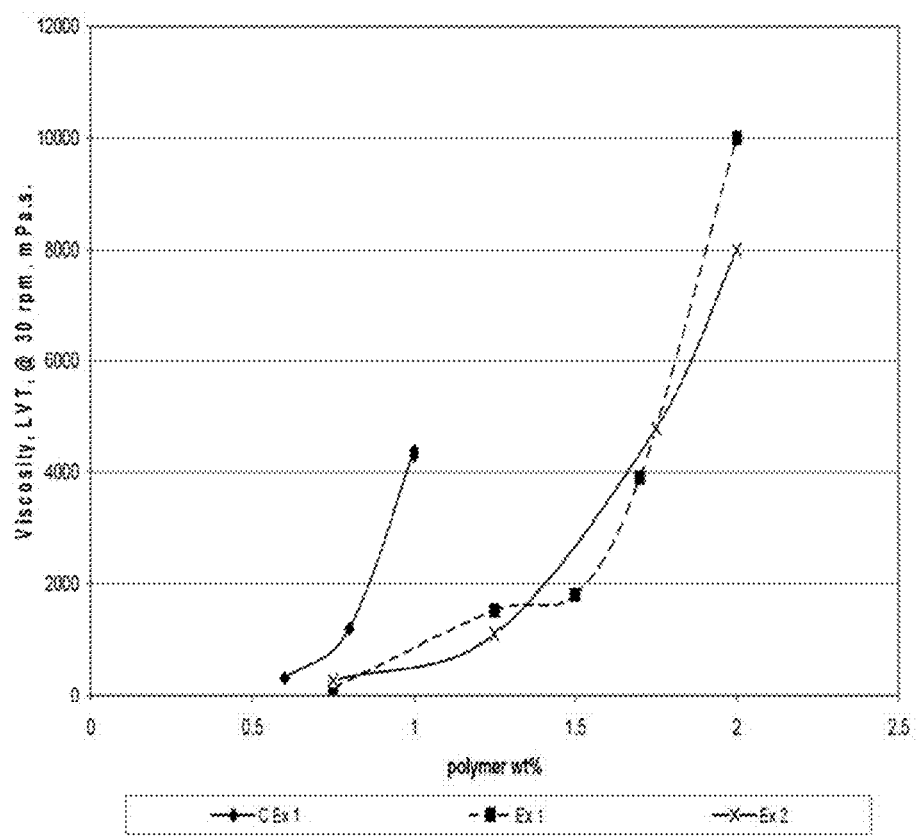
FIG. 5 is a line graph depicting the thickening efficiency of Examples 1 and 2 as well as Comparative Example 1 in a model surfactant formulation.

The thickening efficiency of Examples 1 and 2 as well as Comparative Example 1 were studied. Lower thickening efficiency in a model surfactant formulation was observed for Examples 1 & 2 compared to the results obtained for Comparative Example 1. The results of this study are listed in Table 10 and FIG. 5.

Figure 6:
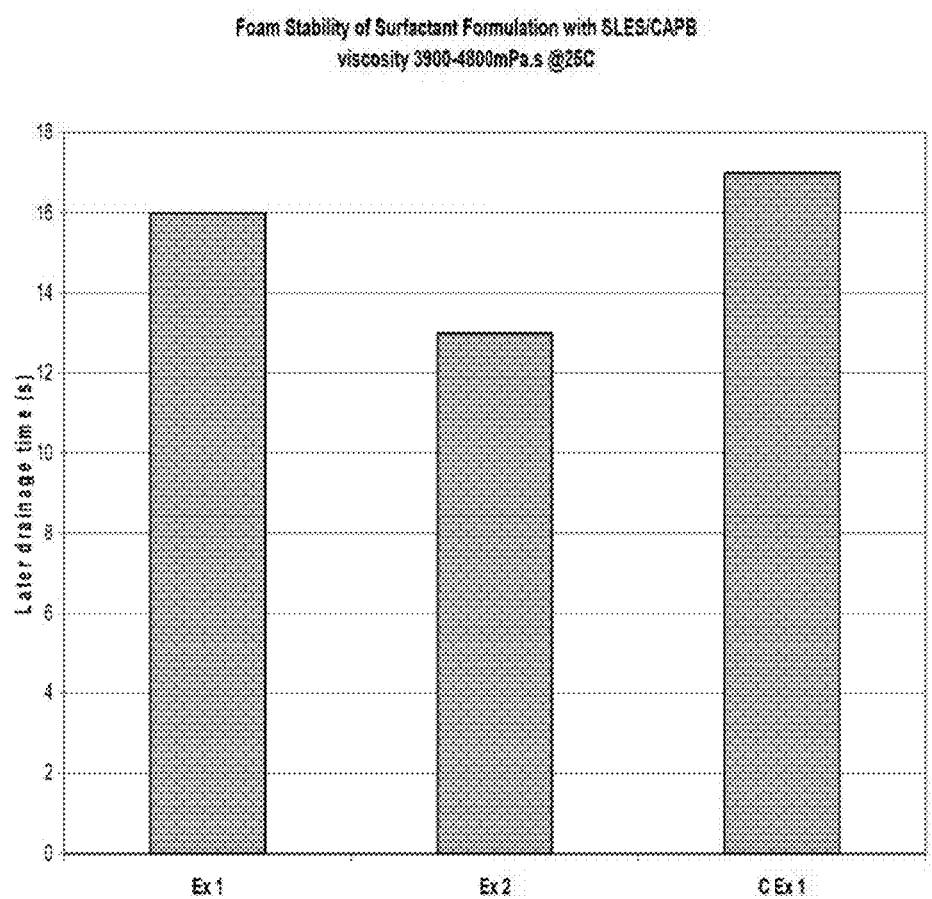
FIG. 6 is a bar graph depicting the foam stability of surfactant formulations containing an amount of the polymer of Examples 1 & 2 or Comparative Example 1.

Foam stability of a model surfactant formulation containing an amount of the materials of Examples 1 and 2 as well as Comparative Example 1 was studied, as shown in FIG. 6. All materials showed coarse foam, no difference in the foam texture. No difference was observed in the foam stability as well.

Although the invention has been described with referenced to preferred embodiments, it is to be understood that variations and modifications in form and detail thereof may be made without departing from the spirit and scope of the claimed invention. Such variations and modifications are to be considered within the purview and scope of the claims appended hereto.

What is claimed:

1. A cross-linked carboxylic acid copolymer comprising:
   a. recurring units of an olefinic unsaturated carboxylic acid, and
   b. recurring units of a non-hydrocarbyl group present in an amount of from about 3 to about 5% by weight of the cross-linked carboxylic acid copolymer,
   wherein said copolymer is crosslinked with a di, tri or tetra-functional crosslinker which is present in an amount of from 0.6 to 1.2% by weight such that said cross-linked carboxylic acid copolymer is soluble in water, and the non-hydrocarbyl group comprises a fluorinated hydrophobic monomer.

2. The cross-linked carboxylic acid copolymer of claim 1 wherein the olefinic unsaturated carboxylic acid is selected from the group consisting of acrylic acid, methacrylic acid, ethacrylic acid, alpha-chloro-acrylic acid, alpha-cyano acrylic acid, beta methylacrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acid (1-carboxy-4-phenyl butadiene-1,3), itaconic acid, citraconic acid, mesaconic acid, glutaconic acid, aconitic acid, maleic acid, fumaric acid, and tricarboxy ethylene.

3. The cross-linked carboxylic acid copolymer of claim 1 wherein the di, tri or tetra-functional crosslinker is selected from the group consisting of butadiene, isoprene, divinyl benzene, divinyl naphthalene, allyl acrylates, trimethylolpropane diallylether, trimethylpropane triacrylate, allyl sucrose, and tetraallyl pertaarythritol ether.

4. The cross-linked carboxylic acid copolymer of claim 1 wherein the di, tri or tetra-functional crosslinker is selected from the group consisting of diallyl esters, dimethallyl ethers, allyl or methallyl acrylates and acrylamides, tetraallyl tin, tetravinyl silane, polyalkenyl methanes, diacrylates, and dimethacrylates, divinyl compounds such as divinyl benzene, polyallyl phosphate, diallyloxy compounds and phosphite esters.

5. The cross-linked carboxylic acid copolymer of claim 1 wherein the di, tri or tetra-functional crosslinker is selected from the group consisting of allyl pentaerythritol, trimethylolpropane diallylether and allyl sucrose.

6. The cross-linked carboxylic acid copolymer of claim 1 wherein the fluorinated hydrophobic monomer comprises fluorinated alkyl methacrylate.

7. The cross-linked carboxylic acid copolymer of claim 6 wherein the olefinic unsaturated carboxylic acid comprises acrylic acid, the di, tri or tetra-functional crosslinker comprises tetraallyl pentaerythritol ether and wherein the fluorinated alkyl methacrylate is present in an amount of about 3 to about 5% by weight of the cross-linked carboxylic acid copolymer.

* * * * *